(12) United States Patent
Hong

(10) Patent No.: US 10,975,976 B2
(45) Date of Patent: Apr. 13, 2021

(54) SAFETY VALVE

(71) Applicant: ACTIVE TOOLS INTERNATIONAL (HK) LTD., Causeway Bay (CN)

(72) Inventor: Ying Chi David Hong, Causeway Bay (CN)

(73) Assignee: ACTIVE TOOLS INTERNATIONAL (HK) LTD., Causeway Bay (HK)

( * ) Notice: Subject to any disclaimer, the term of this patent is extended or adjusted under 35 U.S.C. 154(b) by 298 days.

(21) Appl. No.: 15/998,621

(22) PCT Filed: Feb. 17, 2016

(86) PCT No.: PCT/CN2016/073908
§ 371 (c)(1),
(2) Date: Aug. 16, 2018

(87) PCT Pub. No.: WO2017/139925
PCT Pub. Date: Aug. 24, 2017

(65) Prior Publication Data
US 2020/0332909 A1    Oct. 22, 2020

(51) Int. Cl.
*F16K 15/00* (2006.01)
*F16K 17/06* (2006.01)
(Continued)

(52) U.S. Cl.
CPC ............ *F16K 17/06* (2013.01); *F16K 17/044* (2013.01); *F16K 15/18* (2013.01); *F16K 17/0486* (2013.01);
(Continued)

(58) Field of Classification Search
CPC ......... Y10T 137/2605; Y10T 137/2705; Y10T 137/7876; F16K 17/168; F16K 17/048; F16K 15/18
See application file for complete search history.

(56) References Cited

U.S. PATENT DOCUMENTS 500,645 A * 7/1893 West ................ F16K 17/168
137/522
1,036,513 A * 8/1912 Nichol ................ F16K 17/00
137/466
(Continued)

FOREIGN PATENT DOCUMENTS

CH    124191 A    1/1928
EP    0325194 A2  7/1989

OTHER PUBLICATIONS

Supplementary European Search Report for Application No. 16890160. 1, dated Aug. 13, 2019, 8 pages.

*Primary Examiner* — Robert K Arundale
(74) *Attorney, Agent, or Firm* — McCarter & English, LLP; David R. Burns

(57) ABSTRACT

The present application relates to a safety valve, in particular a safety valve which can be released by manual operation and automatic operation. The safety valve comprising: valve body having an inlet, an outlet and a releasing port; and valve core being movable within the valve body between a close position in which the inlet communicates with the outlet and an open position in which the inlet communicates with the releasing port, the valve core comprises a resilient member which biases the valve core to the close position; wherein the position of the valve core can be manually or automatically controlled such that the valve core is able to switch between the close position and the open position, fluid flows from the inlet to the outlet in the close position and flows from the inlet to the releasing port in the open position.

9 Claims, 8 Drawing Sheets

(51) Int. Cl.
  *F16K 17/04* (2006.01)
  *F16K 17/164* (2006.01)
  *F16K 15/18* (2006.01)
  *F16K 17/168* (2006.01)
  *G05D 16/10* (2006.01)

(52) U.S. Cl.
  CPC .......... *F16K 17/164* (2013.01); *F16K 17/168* (2013.01); *F17C 2205/0332* (2013.01); *G05D 16/10* (2013.01); *Y10T 137/2605* (2015.04); *Y10T 137/7876* (2015.04)

(56) References Cited

U.S. PATENT DOCUMENTS

| | | | | |
|---|---|---|---|---|
| 1,050,938 A * | 1/1913 | Gamble | ................ | F16K 15/038 137/512.1 |
| 2,138,125 A * | 11/1938 | Schultz | ................... | F16K 21/04 137/522 |
| 2,500,156 A | 3/1950 | Dechant | | |
| 2,516,159 A * | 7/1950 | Stroop | .................. | F16K 17/168 137/70 |
| 2,717,003 A | 9/1955 | Bertram | | |
| 2,884,004 A * | 4/1959 | Dierdorf | ............... | F16K 17/168 137/522 |
| 3,189,040 A * | 6/1965 | Johnson | ................ | F16K 17/044 137/469 |
| 3,200,839 A * | 8/1965 | Gallagher | ........... | F16K 17/0433 137/516.29 |
| 3,702,141 A * | 11/1972 | Wetterhorn | ........... | F16K 17/082 137/469 |
| 4,085,772 A * | 4/1978 | Roger | .................. | F16K 17/168 137/464 |
| 4,103,704 A * | 8/1978 | Richards | ................ | F16K 17/06 137/522 |
| 4,168,723 A * | 9/1979 | Schneider | ............... | F16K 17/04 137/542 |
| 4,276,901 A * | 7/1981 | Lyons | .................. | F16K 17/168 137/469 |
| 4,350,176 A * | 9/1982 | Lace | ....................... | F16K 17/04 137/242 |
| 4,543,987 A * | 10/1985 | Ekeleme, Jr. | ....... | F16K 17/0413 137/522 |
| 4,616,677 A * | 10/1986 | Krechel | .................. | F16K 1/305 137/878 |
| 4,726,395 A * | 2/1988 | Howes | ..................... | F16K 1/32 137/469 |
| 5,644,930 A * | 7/1997 | Albertson | ............... | F16L 55/07 251/150 |
| 5,771,924 A * | 6/1998 | Huygen | ............. | F16K 17/0453 137/522 |
| 2005/0274831 A1 | 12/2005 | Burdick | | |
| 2007/0051410 A1* | 3/2007 | Mackal | ................. | F16K 15/205 137/522 |
| 2011/0168277 A1* | 7/2011 | Dulac | ................... | F16K 17/168 137/468 |
| 2012/0191037 A1* | 7/2012 | Patel | ..................... | A61M 39/10 604/30 |
| 2015/0059884 A1* | 3/2015 | Grenaway | ........... | F16K 17/0486 137/538 |
| 2015/0101678 A1 | 4/2015 | Chu | | |
| 2020/0332909 A1* | 10/2020 | Hong | ................... | F16K 17/044 |

* cited by examiner

SAFETY VALVE

CROSS-REFERENCE TO RELATED PATENT APPLICATIONS

This application is a 35 U.S.C. § 371 National Stage filing of International Application No. PCT/CN2016/073908, filed on Feb. 17, 2016, the content of which is hereby incorporated by reference in its entirety.

TECHNICAL FIELD

The present application relates to a safety valve, in particular a safety valve which can be released by manual operation and automatic operation.

BACKGROUND OF THE INVENTION

Safety valves are generally needed for a pressure loop in the gaseous pressure device and the hydraulic pressure device in the prior art to guarantee that the pressure will be released when the pressure is beyond a predetermined level, or the pressure can be released as desired. The safety valve can be divided into manual safety valve and automatic safety valve according to the trigger methods. The automatic safety valve will automatically open to release the pressure without manual input when the pressure is beyond the pressure threshold. The manual safety valve will manually open to release the pressure by manual operation or outside input. In order to prevent the risk of the failure of the automatic safety valve, it is preferred that a manual safety valve is provided together so that over pressure can be manually released if needed.

As it is required to provide two safety valves in the pressure loop, the configuration of the pressure loop would be more complicated. Moreover, the space would be a prominent issue in some applications. Two safety valves would possess more space, which is not desired.

SUMMARY OF THE INVENTION

To solve the above problems, the present application provides a safety valve which has a manual operation mode and an automatic operation mode.

In the safety valve of the present application, manual pressure releasing and automatic pressure releasing are achieved by adjusting a same valve core, thus a more compact structure is achieved.

In an embodiment of the present application, it is provided a safety valve comprising a valve body having an inlet, outlet and releasing port, a valve core and a control means. The valve core can be movable within the valve body between a close position in which the inlet is communicated with the outlet and an open position in which the inlet is communicated with the releasing port. The valve core comprises a resilient member which biases the valve core to the close position. The control means can manually or automatically control the position of the valve core to switch the valve core between the close position and the open position. The fluid can flow from the inlet to the outlet in the close position and flow from the inlet to the releasing port in the open position.

In another embodiment of the present application, the outlet is also communicated with the releasing port when the valve core is in the open position.

In another embodiment of the present application, the control means comprises a button connected to the valve core, the button can be manually operated in such a way that the valve core overcomes the biasing force of the elastic member and enters into the open position from the close position.

In another embodiment of the present application, the fluid flowing through the valve body acts upon the valve core such that the valve core enters into the open position from the close position when the pressure of the fluid is larger than the biasing force of the elastic member.

In another embodiment of the present application, the valve body comprises a horizontal passage and a vertical passage which are cross interconnected, the inlet and the outlet are disposed at ends of the horizontal passage, the valve core is positioned along the vertical passage. The valve core seals the vertical passage against the horizontal passage in the close position such that the fluid can not be discharged through the vertical passage, and the horizontal passage is communicated with the vertical passage when the valve core is in the open position such that the fluid can be discharged through the vertical passage.

In another embodiment of the present application, the valve core comprises a valve stem, a valve membrane and a resilient member. The control means is mounted at an end of the valve stem and the resilient member is disposed at another end of the valve stem. The valve stem is arranged passing the horizontal passage. The valve membrane seals the vertical passage against the horizontal passage under the act of the elastic member.

In another embodiment of the present application, the vertical passage extends upwards from the horizontal passage. The resilient member comprises an upper spring for biasing the valve membrane to seal the vertical passage. The valve core enters into the open position when the pressure within the valve body overcomes the biasing force of the upper spring, so that the horizontal passage communicates with the vertical passage and the fluid is discharged through the vertical passage.

In another embodiment of the present application, the valve stem has a reversed T shape having a head portion and a rod portion. The valve membrane is provided with a through hole. The diameter of the rod portion is smaller than the diameter of the through hole, and the diameter of the head portion is larger than the diameter of the through hole. The rod portion passes through the through hole. The valve stem can be manually operated such that the valve core can move into an open position from the close position to manually release the pressure.

In another embodiment of the present application, it further comprises a lower spring acting on the head portion to assist the head portion in returning to the sealing state.

In another embodiment of the present application, the valve stem is provided with a stop, the control means comprises a button which can move up and down with respect to the valve stem. The button has downwardly extending flanges. The flanges are in a substantially U-shape and comprise activating portions which are upwardly bent. The activating portions engage with the stop and the bottoms of the U-shape contact with the valve body such that the downward movement of the button will be transferred into the upward movement of the activating portion, thus the valve core can be opened.

In another embodiment of the present application, the valve core also prevents the fluid from entering the outlet when it is in the open position.

In another embodiment of the present application, the fluid is gas.

In another embodiment of the present application, the manual operation and the automatic operation are achieved by a same valve core.

In another embodiment of the present application, the valve core is a straight-type structure.

In another embodiment of the present application, the valve core is a portion of a tire repair machine.

The inlet of the safety valve of the present application can be connected to a fluid source and the outlet can be connected to a device using fluid. The safety valve of the present application can be not only automatically operated but also manually operated, and a compact structure is also provided.

THE BRIEF DESCRIPTION OF THE DRAWINGS

DETAILED EMBODIMENTS

The following will describe some embodiments of the present application in combination with the drawings. The detailed embodiments should not be regarded as a limitation to the present application, but only aim to explain the concept of the present application.

Figure 1:
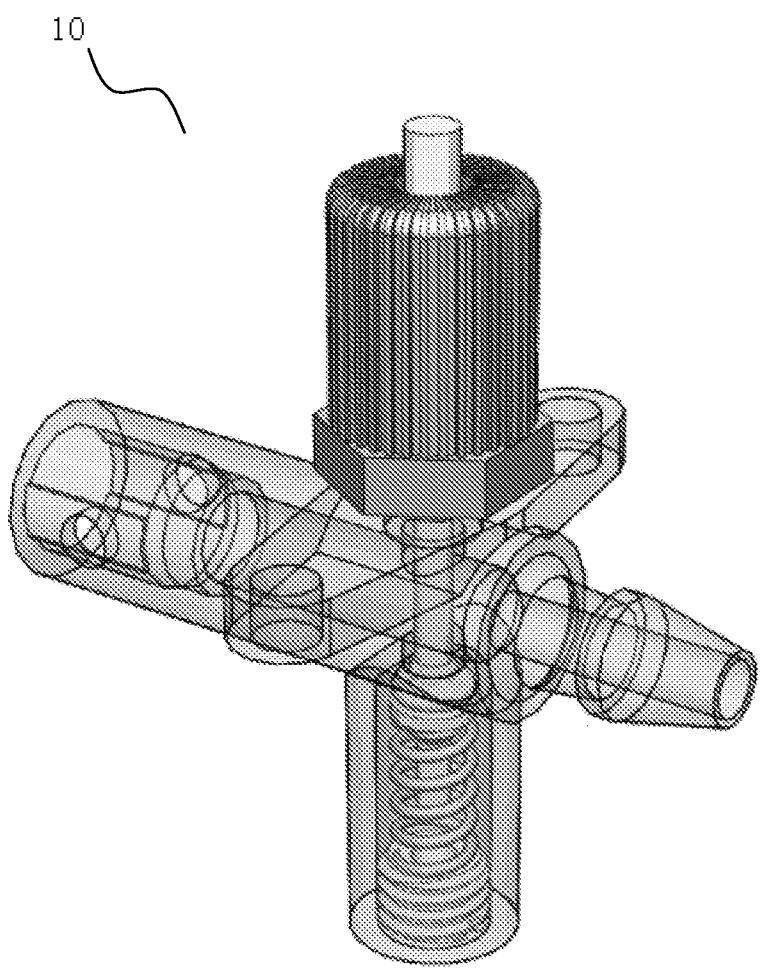
FIG. 1 is a perspective view of an embodiment of the present application.

FIG. 1 shows an embodiment of the present application, using a perspective view to show the valve core and the arrangements of the passages within the valve body. The safety valve 10 has a valve body 1 and a valve core. The valve body can have a cross shape. However, one skilled in the art would understand that the valve body may have other shape and suitable structures. Horizontal passage and vertical passage are provided within the valve body. The horizontal passage is used to connect the inlet and the outlet. A valve core is disposed in the vertical passage, which valve core is able to move along the vertical passage to be switched between an open position and a close position.

Figure 2:
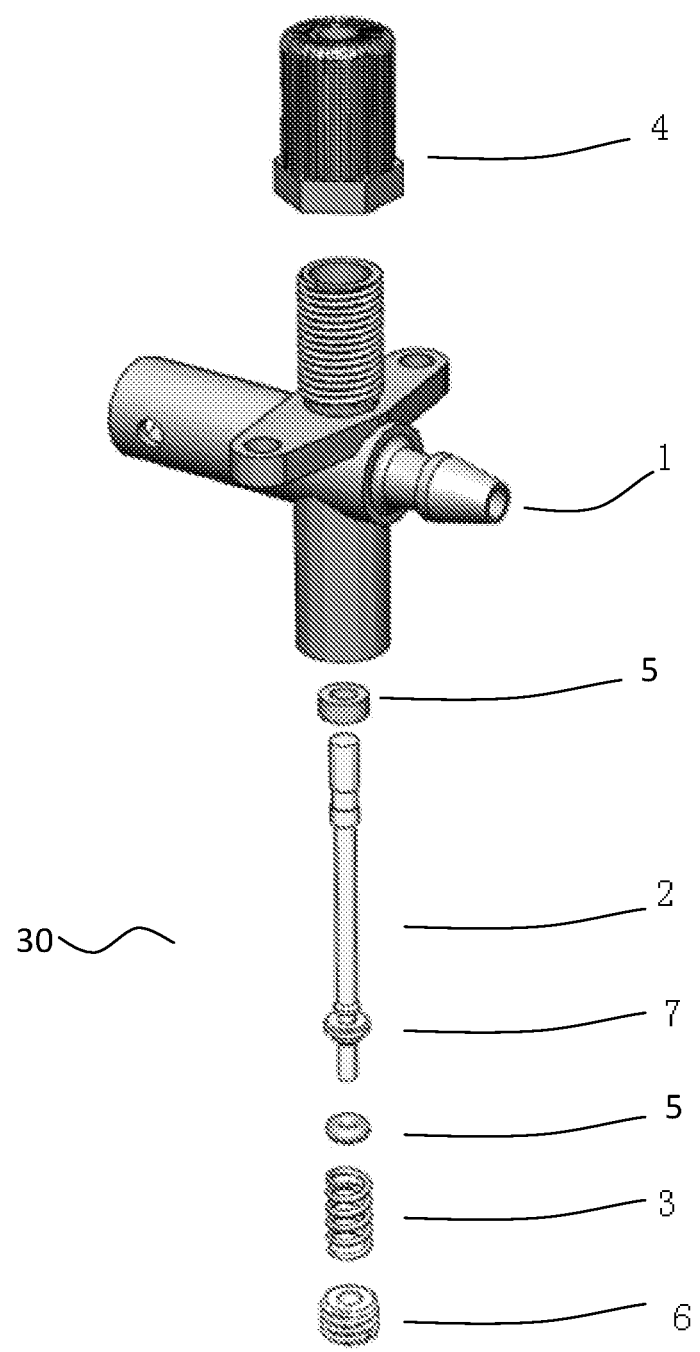
FIG. 2 is an exploded perspective view of an embodiment of the present application, showing the valve body and the valve core.

Next, the detailed structure of the safe valve will be described in more detail in combination with FIG. 2. As shown in the figure, the valve body has a cross shape design, and defines a horizontal passage and a vertical passage. The horizontal passage and the vertical passage are interconnected to form an interface. The valve core is mounted within the vertical passage to selectively abut the interface, such that the vertical passage will be sealed against the horizontal passage when the valve core is in the close position, and the fluid flowing through the horizontal passage will not enter the vertical passage; the vertical passage will communicate with the horizontal passage when the valve core is in the open position and the fluid flowing through the horizontal passage will enter the vertical passage.

Figure 3:
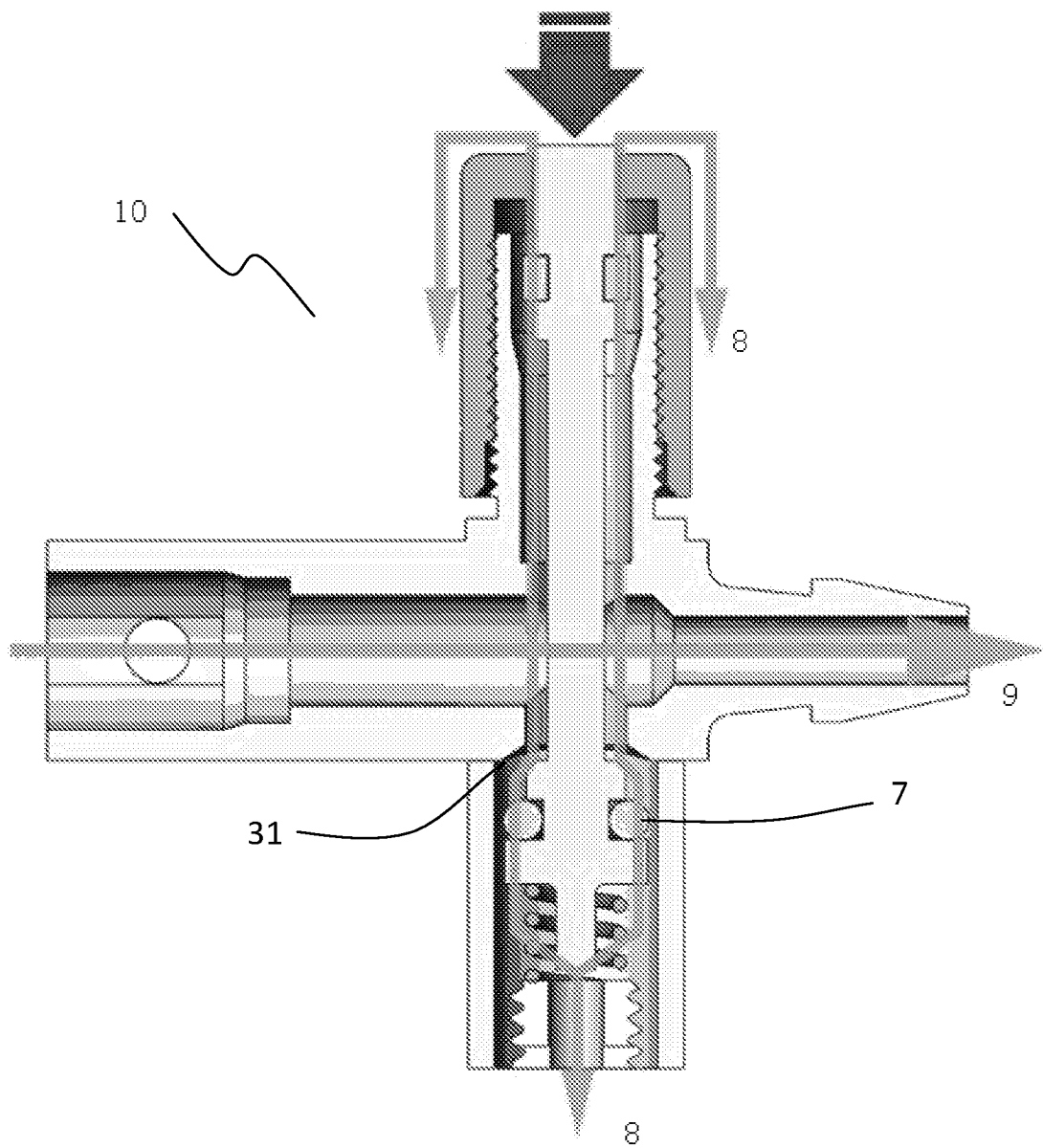
FIG. 3 shows the safe valve of the embodiment of FIG. 2, which is in the manual releasing mode. The drawing shows the fluid paths.

The vertical passage is opened at two ends. The upper portion of the vertical passage can be provided with outer thread for threadedly connecting to the cap 4. The lower portion of the vertical passage can be provided with inner thread (not shown) to connect with the fixture 6 so that the valve core 30 will be contained within the vertical passage. A through hole can be provided in the fixture 6 as a releasing port. The valve core comprises a valve stem 2, a valve membrane 7 and a spring 3. The valve membrane 7 is fixed on the valve stem 2 for sealing the vertical passage when the valve core is in the close position. Alternatively, the valve membrane 7 can be integrally formed on the valve stem. The spring 3 is provided under the valve membrane and biases the valve core to maintain the seal of the vertical passage against the horizontal passage. As shown in FIG. 3, the vertical passage can be provided with a step 31. The diameter of the vertical passage above the step 31 is smaller than that under the step 31. The valve membrane is formed by a sealing ring disposed between two circumferential projections on the valve stem 2. The spring 3 biases the valve stem such that the valve membrane abuts the step 31 to form a seal.

Sealing rings 5 can be provided at two end of the valve stem to avoid undesired leakage. The fixture 6 is threadedly inserted into the lower portion of the vertical passage after the valve core is mounted in the vertical passage, the spring 3 will be compressed such that the valve membrane 7 abuts the interface between the horizontal passage and the vertical passage such that the vertical passage is sealed against the horizontal passage. The cap 4 is mounted to the upper portion of the vertical passage. Fox example, the cap 4 is connected to the valve body by threads as shown in FIG. 2. It however should be understood that the cap 4 can be connected to the valve body using other connecting methods.

The releasing port can be provided at one end of the vertical passage or both ends of the vertical passage. The upper end of the valve stem 2 is preferably protruded from the opening of the cap 4 after the cap 4 is mounted, so that a user can press the valve stem 2 to make it displace to overcome the biasing force of the spring, such that the valve membrane will enter the open position to achieve pressure releasing. Acting on the valve membrane 7 is the pressure of the fluid flowing through the horizontal passage. Therefore, when the pressure is beyond a threshold, i.e. overcoming the biasing force of the spring 3, the valve membrane 7 is moved downwards into the open position and pressure releasing is achieved. Therefore, manual operation and automatic operation can be achieved by the same valve core, which results a more compact structure.

FIG. 3 shows the safety valve in a pressure releasing state using a sectional view. The arrow 9 shows the normal direction of the fluid from the inlet to the outlet. The arrow 8 shows the direction of the releasing of the fluid when the valve core is in the open position. The releasing direction can be designed as desired, e.g. the upward direction as shown in the figure, or the downward direction as shown in the figure, or both. Other releasing manner is also suitable. In the case that the releasing port is only provided at the lower portion of the vertical passage, the through hole of the fixture 6 can be used as releasing port. The releasing port can be provided at the upper portion of the vertical passage. In this circumstance, as shown in FIG. 3, the upper portion of the valve stem 2 is also provided with a seal cooperating with the upper portion of the vertical passage, such that the vertical passage is sealed when the valve core is in the close position, and the vertical passage communicates with the outside when the valve core is in the open position. The seal at the upper portion of the valve stem can cooperate with the cap 4 to realize sealing.

Therefore, pressure releasing can be achieved by manually pressing the valve stem, and also achieved when the pressure of the fluid in the valve body overcomes the biasing force of the resilient member such as a spring.

Figure 4:
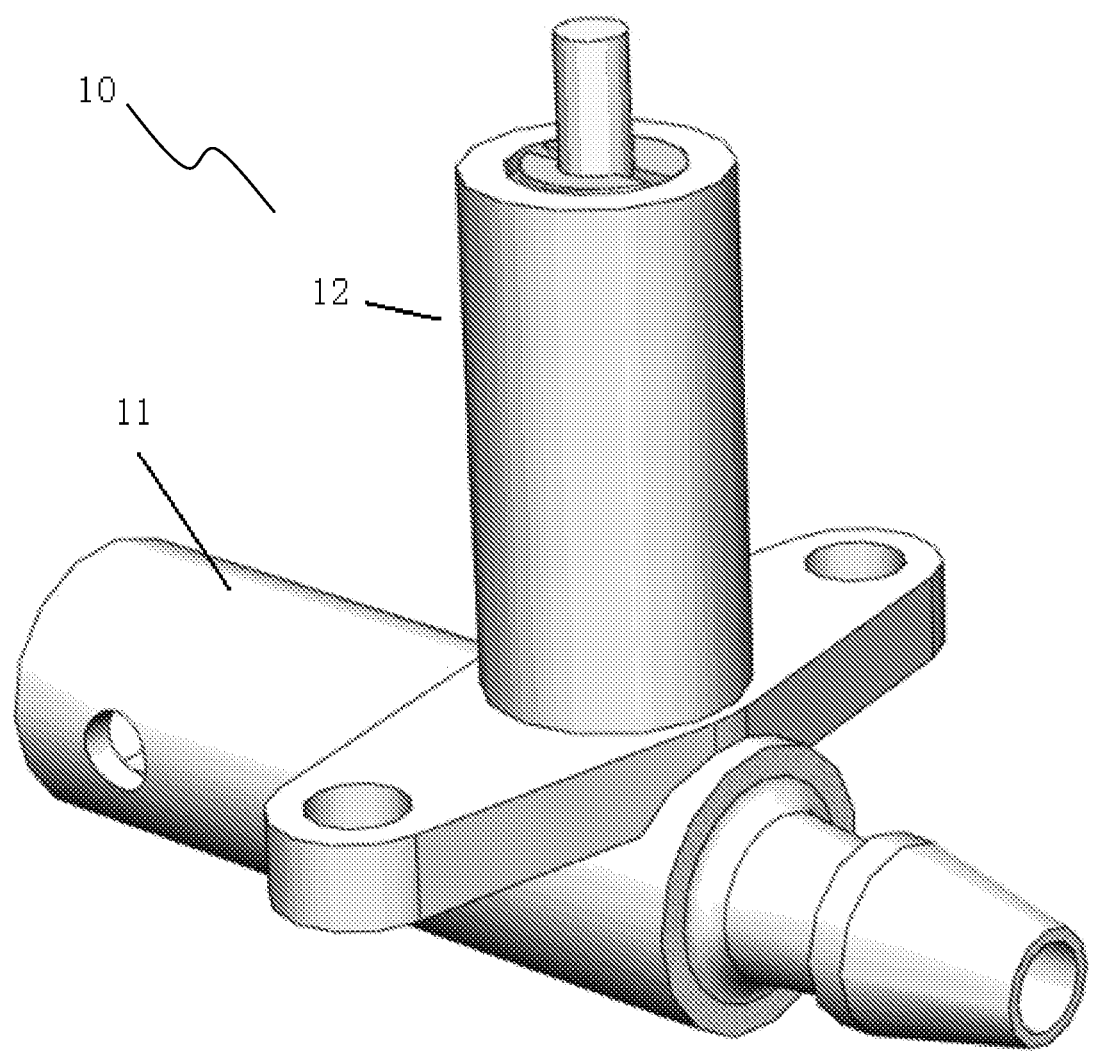
FIG. 4 is a perspective view of another embodiment of the present application.
Figure 5:
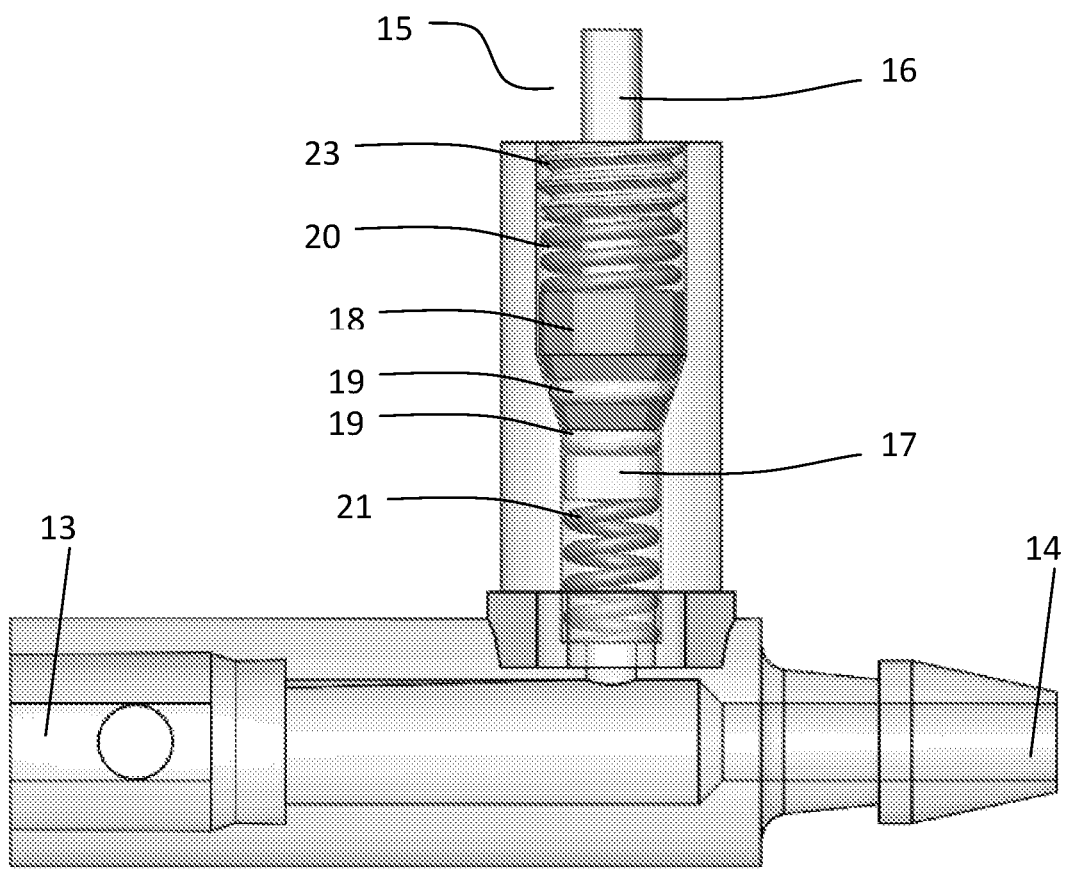
FIG. 5 shows the inner detail structure of the embodiment of FIG. 4.
Figure 6:
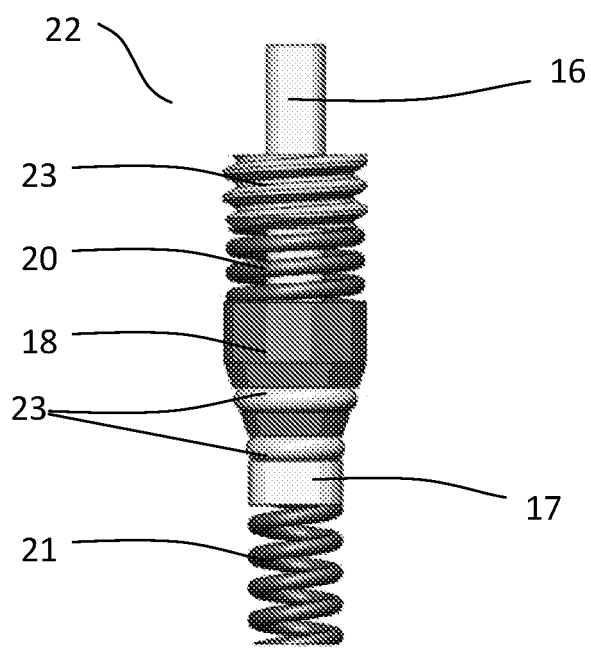
FIG. 6 shows the structure of the valve core.

FIG. 4 shows another embodiment of the present application. The safe valve 10 comprises a valve body comprising a horizontal passage 11 and a vertical passage 12. The vertical passage 12 extends upwardly from the horizontal passage 11. FIG. 5 shows the inner structure of the embodiment of FIG. 4 in a sectional view. The horizontal passage 11 has an inlet 13 and an outlet 14. A valve core 22 is provided within the vertical passage 11 for sealing the vertical passage against the horizontal passage. FIG. 6 shows the valve core 22 more clearly. The valve core 22 comprises valve stem 15, fixture 23 and valve membrane 18. The valve stem 15 comprises a rod portion 16 and a head portion 17. A through hole is provided in the valve membrane 18. The diameter of the rod portion 16 is smaller than the diameter of the through hole of the valve membrane 18 such that the rod portion 16 can be freely inserted into the through hole of the valve membrane 18. The head portion 17 is larger than the diameter of the through hole of the valve membrane 18 so that the head portion 17 can not pass the valve membrane 18. The head portion 17 will form a seal with the valve membrane 18. An upper spring 20 is provided on the valve membrane 18. To increase the sealing effect of the valve membrane 18, the valve membrane can be provided with sealing ring 19. The fixture 23 can be fixed to the vertical passage 12, for example by threaded connection, after the valve stem is mounted within the vertical passage, such that the upper spring 20 is pre-pressed by the fixture 23 whereby the valve membrane 18 is biased on the valve seat. The valve stem 15 can pass through the fixture 23 and extend beyond the vertical passage. In order to control the valve stem, the control member (not shown) can be connected to valve stem.

As shown in FIG. 5, the vertical passage has a first section at the upper portion and a second section at the lower portion, the diameter of the first section is larger than the diameter of the second section. An interface is formed between the first section and the second section, which becomes a valve seat. A seal will be formed by the valve membrane and the valve seat such that the fluid can not be discharged through the vertical passage. The fluid acts on the valve membrane so that the valve membrane 18 will press the upper spring 22 and enter into the open position when sufficient pressure is acting on the valve membrane 18. In this circumstance, the fluid can bypass the valve membrane and flow out from the vertical passage. An automatic overpressure protection for the pressure loop thus can be achieved.

The threshold of the safety valve is controlled by selecting the elastic Modulus of the spring, the compressed length of the spring.

Due to the pressure of the fluid, the head portion 17 of the valve stem 15 is pressed on the valve membrane 18 to form a seal at the normal condition. The fluid thus can not flow through the head portion 17 and the valve membrane 18. A user can press the valve stem 15 downwards to disengage the head portion 18 and the valve membrane 18. The fluid then can flow through the through hole of the valve membrane 18, such that pressure releasing is achieved. It should be understood that the head portion 17 is smaller than the diameter of the second section and can move within the second section when the valve stem 15 is pressed. If necessary, a lower spring 21 is provided to assist the return of the head portion 17 after the pressure releasing. The second section of the vertical passage accordingly provides a step having a smaller diameter to abut the lower spring 21. It is appreciated that the lower spring 21 can not adversely affect the seal between the valve membrane 18 and the valve seat. For example, the biasing force of the lower spring 21 can be smaller than the difference between the biasing force and the force induced by the threshold pressure. It is preferred that the lower spring is in a relax state before the valve stem is pressed downwards.

The projection portion of the valve stem can be used as a control portion. When necessary, the user can press the valve stem 15 such that the safety valve will enter into pressure releasing state. In the embodiment as shown in FIG. 5, pulling the valve stem 15 upwards would also realize the pressure releasing. Similar to the embodiment of FIG. 2, a cap 4 can be provided to mate with the vertical passage. The cap 4 can be integrated with the fixture 23. In this circumstance, the cap will be a reversed U-shape structure. It can be understood that the reversed U-shape cap can cooperate with the outer thread of the vertical passage as shown in FIG. 2, or with the inner thread of the vertical passage.

It is appreciated that the vertical passage and the horizontal passage can be integrally formed as one piece. Alternatively, the vertical passage and the horizontal passage can be independent components, and the vertical passage can connect to the horizontal passage in seal manner using e.g. thread connection, etc.

Therefore, manual operation and automatic operation can be achieved by the valve core 22, and thus compact structure is provided. The activation of the control member is preferably realized by pressing, in view of the emergency of manual pressure releasing in some cases.

Figure 7:
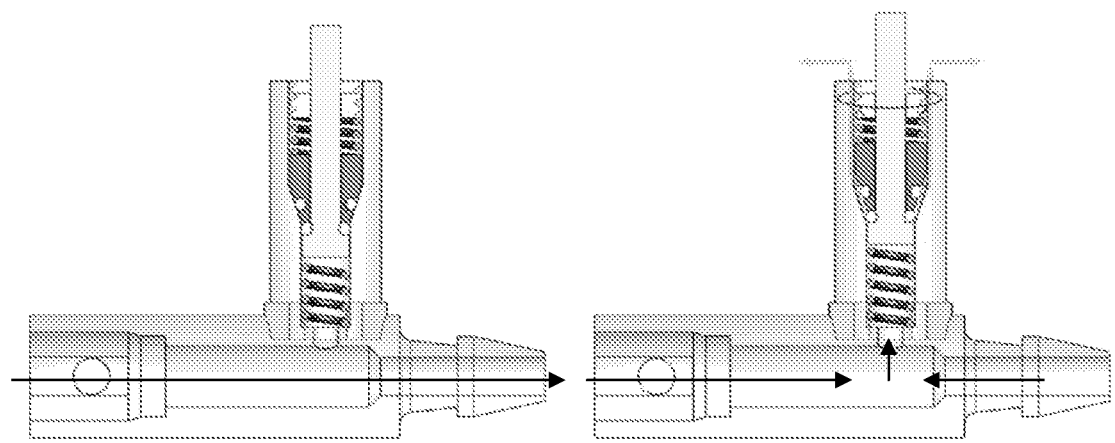
FIG. 7 shows the safety valve in a normal state and a manually releasing pressure state.

FIG. 7 shows the fluid flow path in the safety valve in normal state and pressure releasing state. In the normal state, the fluid flows from the inlet to the outlet. In the releasing state, the fluid from the inlet and the outlet can flow out from the vertical passage.

Figure 8:
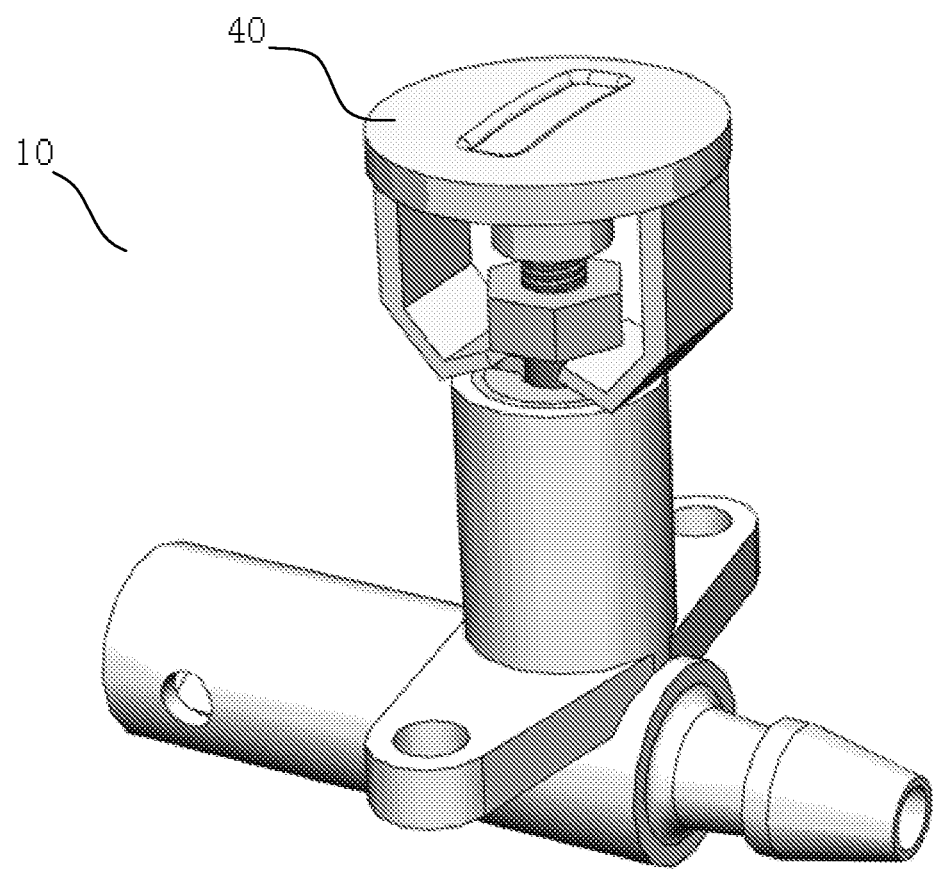
FIG. 8 shows a perspective view of another embodiment of the present application.
Figure 9:
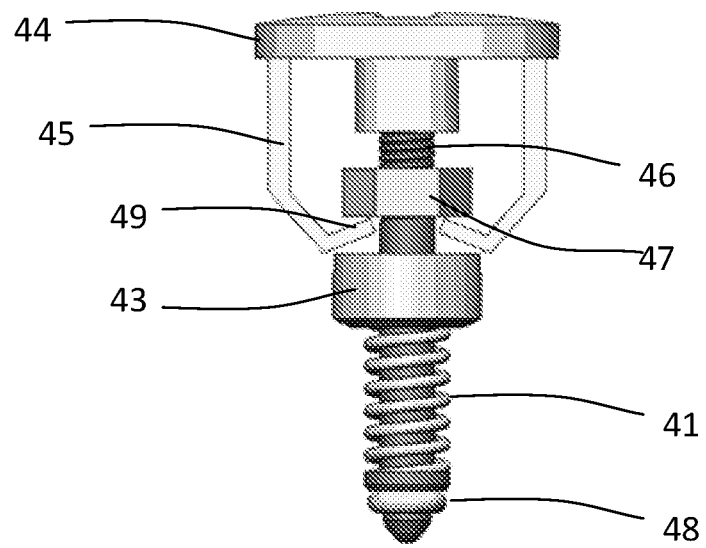
FIG. 9 shows a button and valve core of the embodiment of FIG. 8.

FIG. 8 shows another embodiment of the present application, wherein a control button 40 is provided by which the lift of the valve core is achieved by pressing so as to realize the pressure releasing of the safety valve. FIG. 9 shows the cooperation of the button 40 and the valve core. The button has a top 44 and flanges extending downwardly therefrom. The flanges are spaced apart along the peripheral. Each of the flanges has a substantially U shape comprising an upwardly bend portion. The upwardly bend portion forms an activating portion 49. The flanges have reversible elastic property so that they can return to their original state after the pressing.

The valve core comprises a valve membrane 48 and a spring 41. The spring 41 is used to bias the valve membrane on the valve seat to seal the vertical passage. A fixture 43 is mounted to the vertical passage of the valve body, for example using thread connection, whereby the spring 41 biases the valve membrane. The valve stem 46 can move up and down with respect to the fixture 43. A stop 47 cooperating with the activating portion 49 is also provided on the valve stem 46. The upper portion of the valve stem is provided with thread by which the stop 47 can connect to the valve stem. It can be understood that the stop 47 can be fixed to the valve stem 46 using other methods. The valve stem 46 can move up and down with respect to the control button 40.

Figure 10:
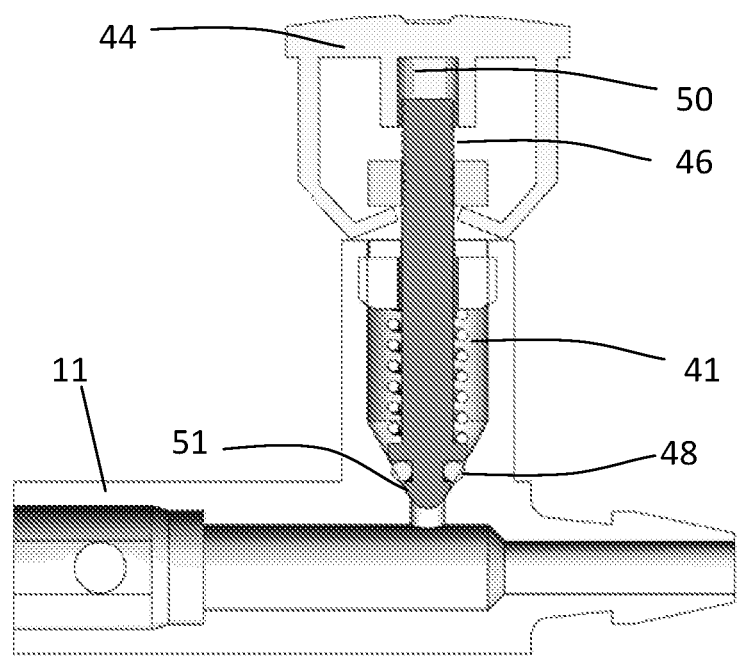
FIG. 10 shows the inner detail structure of the embodiment of FIG. 8.

As shown in FIG. 10, the bottoms of the U-shape flanges 45 of the control button 40 abut the top of the valve body. The control button 40 can move up and down with respect to the valve stem 46. A gap 50 is provided between the button 40 and the valve stem 16 as shown in the figure. Valve core is installed in the vertical passage and the spring 41 biases the valve membrane 48 into seal engagement with the valve seat 51 such that the vertical passage is sealed. The valve membrane 48 will be opened when the fluid pressure in the horizontal passage increases to an extent that overcomes the biasing force of the spring. When necessary, the user can press the button 40 such that the top 44 moves downwards and the activating portion 49 in turn moves upwards to move the valve core upwards into the open position. Therefore, manual pressure releasing is achieved. After the user releases the button 40, the valve core will move downwards under the act of the spring 41 to reseal the vertical passage. Stop 47 will push the activating portion 49 downwards such that the button 40 will return to its original state. The button 40 can also return to its original state under its ecstatic property.

Figure 11:
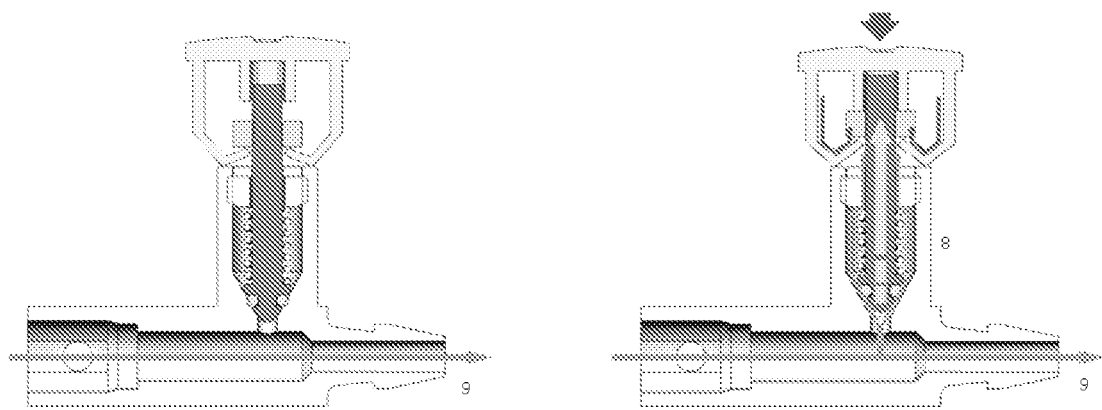
FIG. 11 shows the safety valve in a normal state and a manually releasing pressure state.

FIG. 11 shows the fluid flow path when the safety valve is in different conditions. In the pressure releasing condition, the valve core is opened and the fluid will be discharged through the vertical passage.

In the present application, the fluid can be gas or liquid, such as sealant.

While the above detailed description has shown, described, and pointed out novel features as applied to various embodiments, it will be understood that various omissions, substitutions, and changes in the form and details of the device or process illustrated may be made without departing from the spirit of the disclosure. Additionally, the various features and processes described above may be used independently of one another, or may be combined in various ways. All possible combinations and subcombinations are intended to fall within the scope of this disclosure. Many of the embodiments described above include similar components, and as such, these similar components can be interchanged in different embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, the invention is not intended to be limited by the specific disclosures of preferred embodiments herein.

The invention claimed is:

1. A safety valve comprising: a valve body having an inlet, an outlet and a releasing port; and a valve core being movable within the valve body between a closed position in which the inlet communicates with the outlet and an open position in which the inlet communicates with the releasing port, the valve core comprises a resilient member which biases the valve core to the closed position; and a control means; wherein the position of the valve core can be manually or automatically controlled such that the valve core is able to switch between the closed position and the open position, fluid flows from the inlet to the outlet in the closed position and flows from the inlet to the releasing port in the open position, wherein the control means includes a button connected to the valve core, the button manually operated such that the valve core overcomes a biasing force of the resilient member and switches to the open position from the closed position; the valve core comprises a valve stem provided with a stop, the button is movable up and down with respect to the valve stem, the button has flanges extending downwards and being in a substantially U shape, the flanges comprise activating portions which are bent upwards to engage with the stop, a bottom of the U shape connects with the valve body such that an downward movement of the button is transferred into an upward movement of the activating portion to open the valve core.

2. A safety valve as claimed in claim 1, wherein the outlet also communicates with the releasing port in the open position.

3. A safety valve as claimed in claim 1, wherein the fluid flowing through the valve body acts on the valve core, such that the valve core enters into the open position from the closed position when the pressure of the fluid is greater than a biasing force of the resilient member.

4. A safety valve as claimed in claim 1, wherein the valve body comprises a horizontal passage and a vertical passage intersecting with each other, the inlet and the outlet are disposed respectively at two ends of the horizontal passage, the valve core is disposed along the vertical passage, wherein, in the closed position, the valve core seals the vertical passage against the horizontal passage such that the fluid is prevented from being discharged through the vertical passage, in the open position, the horizontal passage is in fluid communication with the vertical passage such that the fluid is discharged through the vertical passage.

5. A safety valve as claimed in claim 1, wherein the valve core further prevents the fluid flowing into the outlet when it is in the open position.

6. A safety valve as claimed in claim 1, wherein the fluid is gas.

7. A safety valve as claimed in claim 1, wherein the manual control and the automatic control are achieved by a same valve core.

8. A safety valve as claimed in claim 1, wherein the valve core is a straight type structure.

9. A safety valve as claimed in claim 1, wherein the valve core is a part of a tire repair machine.

\* \* \* \* \*